Jan. 13, 1959     H. E. McCORD     2,868,996
POWER SUBSTITUTION CIRCUIT
Filed May 10, 1957
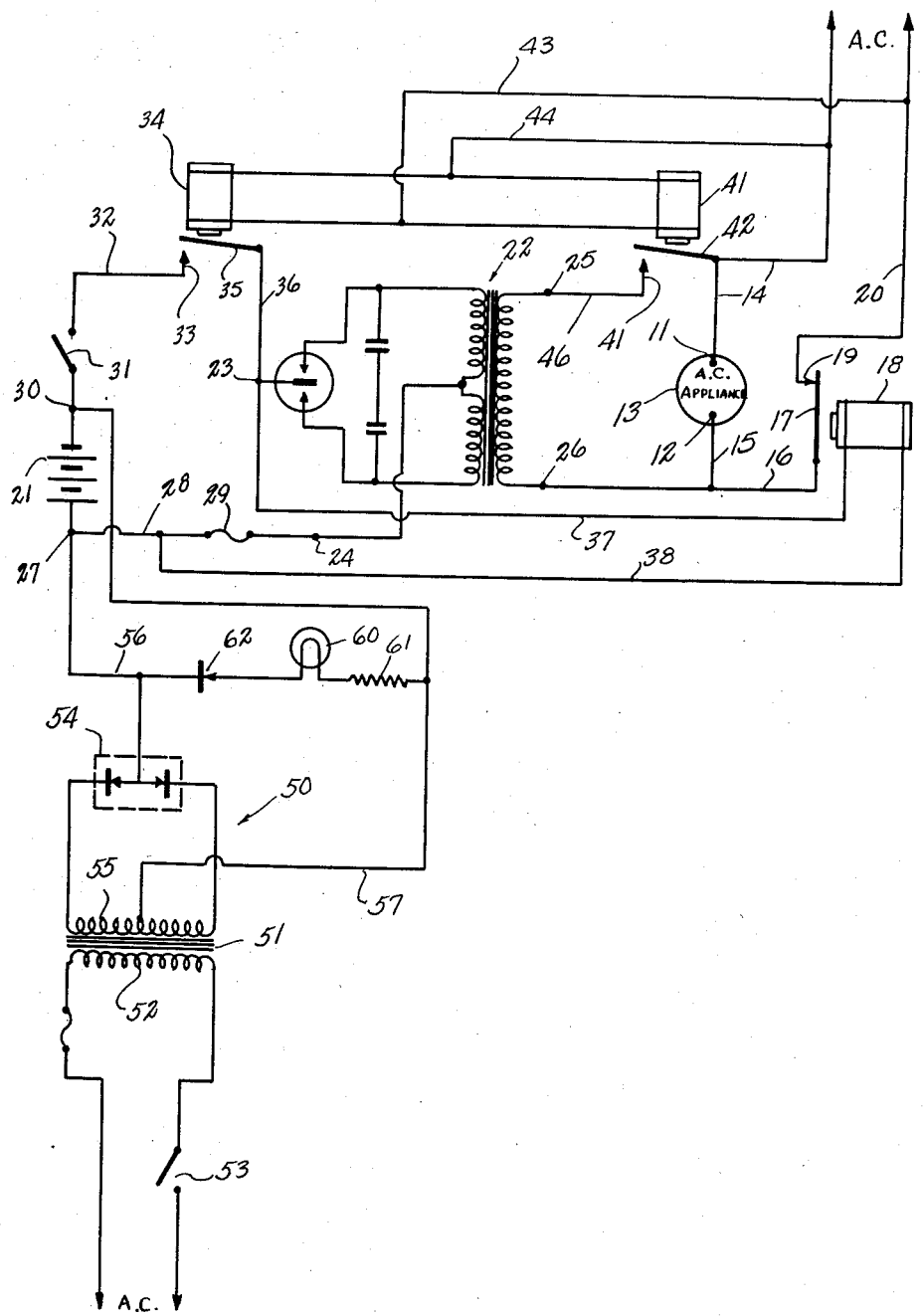
INVENTOR.
HAROLD E. McCORD,
BY
McMorrow, Berman & Davidson
ATTORNEYS.

United States Patent Office 2,868,996
Patented Jan. 13, 1959

2,868,996
POWER SUBSTITUTION CIRCUIT

Harold Eugene McCord, Bremerton, Wash.

Application May 10, 1957, Serial No. 658,356

1 Claim. (Cl. 307—64)

This invention relates to electrical power circuits, and more particularly to an electrical circuit for use in connecting an appliance, such as an electric clock, or the like, to a first source of alternating current, and then for automatically substituting a second alternating current source in the event of failure of the first source.

A main object of the invention is to provide a novel and improved protective arrangement for an appliance, such as an electric clock, or the like, for insuring the continuous operation of the appliance in the event of failure of the main power supply thereof, the circuit being relatively simple in construction, involving inexpensive components, and being reliable in operation.

A further object of the invention is to provide an improved power substitution circuit for automatically substituting an auxiliary alternating current power source in the event that the main alternating current power source of an appliance, such as an electric clock, or the like, fails, whereby continuous operation of the appliance is insured, the circuit being easy to install, involving a minimum number of parts, and being provided with means for charging the battery thereof so that the battery will be always available for use in energizing the auxiliary alternating current portion of the circuit.

Further objects and advantages of the invention will become apparent from the following description and claim, and from the accompanying drawing, wherein the single figure represents a schematic wiring diagram showing an improved power substitution circuit for an alternating current-operated appliance, in accordance with the present invention.

Referring to the drawing, 11 and 12 respectively designate a pair of load terminals to which may be connected any desired alternating current appliance, for example, an electric clock 13. The load terminal 11 is connected to a first alternating current line wire 14. The second load terminal 12 is connected by a wire 15 to a wire 16, said wire 16 being connected to the armature 17 of a relay 18. The stationary contact 19 of relay 18, normally engaged by armature 17, is connected to the remaining alternating current line wire 20.

When the winding of relay 18 is de-energized, as shown in the drawing, the armature 17 engages the contact 19, whereby the respective load terminals 11 and 12 are connected to the respective alternating current supply wires 14 and 20.

Designated at 21 is a battery which is employed as a source of emergency power for the appliance 13, in the event of failure of the main alternating current power source connected to the line wires 14 and 20. Designated generally at 22 is an alternating current inverter of conventional construction having the input terminals 23 and 24 and the output terminals 25 and 26. One of the battery terminals, shown at 27, is connected by a wire 28 to the input terminal 24 of the inverter 22, through a suitable fuse 29. The remaining battery terminal, shown at 30, is connected through a manually controlled switch 31 to a wire 32, which is in turn connected to the stationary contact 33 of a relay 34, said relay being provided with the armature 35 which engages the stationary contact 33 when the relay winding is de-energized. Armature 35 is connected by a wire 36 to the inverter input terminal 23.

The winding of the relay 18 is connected by respective wires 37 and 38 in parallel with the input circuit of the inverter, the wire 37 being connected to the inverter input terminal 23 and the wire 38 being connected to wire 28, so that the winding of relay 18 becomes energized simultaneously with the energization of the input circuit of the inverter, whereby to disconnect wire 16 from line wire 20 and to insure that the load terminals 11 and 12 are disconnected from the main alternating current supply wires during the energization of the inverter.

Output terminal 26 of the inverter is connected to the wire 16 and output terminal 25 is connected to the stationary contact 40 of a relay 41, said relay having an armature 42 engageable with said stationary contact when the relay winding is de-energized.

Armature 42 is connected to the alternating current supply wire 14, said armature 42 engaging the stationary contact 40 when the winding of relay 41 is de-energized. The winding of relay 41 is thus connected in parallel with the winding of relay 34, whereby both armatures 35 and 42 simultaneously engage their associated contacts 33 and 40 when the main alternating current source fails.

With the manually controlled switch 31 closed, failure of the main alternating current source connected to line wires 14 and 20 thus causes the winding of relays 34 and 41 to become de-energized, since said windings are connected in parallel to the line wires 14 and 20 by respective wires 43 and 44, as shown in the drawing. As illustrated, when the normal alternating current power is present, the windings of both of the relays 34 and 41 are energized, causing their armatures 35 and 42 to be disengaged from their stationary contacts 33 and 40. However, when the main alternating current power supply fails, the armatures 35 and 42 engage their contacts 33 and 40. The engagement of armature 35 with contact 33 connects battery 21 to the input terminals of the inverter 22 by a circuit comprising battery terminal 30, switch 31 in closed position, wire 32, contact 33, armature 35, wire 36, inverter input terminal 23, the input circuit of the inverter, terminal 24, fuse 29, wire 28 and the remaining battery terminal 27. The output circuit of the inverter is connected to the load terminals 11 and 12 and to the appliance 13 connected thereto by a circuit comprising output terminal 25, a wire 46 connecting output terminal 25 to relay contact 40, armature 42, engaging said relay contact 40, wire 14, the load terminal 11, the appliance 13, the load terminal 12, the wire 15, the wire 16, and output terminal 26 of the inverter. Thus, the appliance 13 becomes automatically energized from the output of the inverter responsive to the failure of the main alternating current supply. At the same time, the relay 18 becomes energized, since it is connected in parallel with the input circuit of the inverter, disconnecting armature 17 from its contact 19, and insuring that the inverter will not be allowed to feed back current into the main electrical power system, whereby overloading of the inverter is prevented. As will be readily apparent, if the inverter were allowed to feed current to the main electrical system through the line wires 14 and 20, a heavy load would be placed on the inverter output circuit, due to the connection of other devices to the system, which would seriously overload the inverter and probably cause destruction thereof.

As soon as the main alternating current supply system is restored to its normal operative condition, the relays 41 and 34 again become energized, causing their armatures 42 and 35 to disengage from their stationary contacts 40 and 33. The opening of contacts 33, 35 de-energizes the input circuit of the inverter 22, and the opening of the contacts 40, 42 disconnects the load terminal 11 from the output circuit of the inverter. When the input circuit of the inverter is disconnected from battery 21, by the opening of the contacts 33, 35, the winding of the relay 18, being connected in parallel with said input circuit, also becomes de-energized, allowing its armature 17 to engage its associated stationary contact 19, whereby the load terminal 12 is connected to line wire 29, and whereby the appliance 13 may be again energized from the normal alternating current supply source.

A charging circuit is provided for maintaining the battery 21 charged under normal conditions, so that the battery will be instantly available for service should the main power supply fail. Thus, a charging circuit, designated generally at 50 is provided, said charging circuit comprising a step-down transformer 51 having its primary winding 52 connected to the alternating current supply through a manually operated control switch 53. The charging circuit 50 includes a rectifier 54 connected in a conventional manner between the end terminals of the secondary winding 55 of the transformer 51 and the positive battery terminal 27, as by the wire 56. The center tap of the transformer secondary winding 55 is connected by a wire 57 to the negative battery terminal 30, whereby charging current is delivered to the battery 21 when switch 53 is closed, the negative wire 57 feeding the battery at the negative battery terminal 30 and the positive wire 56 feeding the battery at the positive battery terminal 27. An indicating circuit is provided to show charging operation, said circuit comprising a pilot lamp 60 connected in series with a resistor 61 and a half-wave rectifier 62 between positive wire 56 and negative wire 57. The half-wave rectifier 62 is polarized to allow current flow only when the charger is operating, whereby the pilot lamp only becomes energized under these conditions.

The battery 21 may be periodically charged, as often as is necessary, from the charging circuit 50, by closing the charging circuit control switch 53.

Obviously, the device may be employed with any electrical appliance, such as an electric clock, or any other appliance for which it is desired to insure continuous availability of power. Thus, the device may be employed with signal systems, fire alarm systems, burglar alarm systems, or the like, as well as with electric clocks.

While a specific embodiment of an improved power supply substitution circuit has been disclosed in the foregoing, it will be understood that various modifications within the spirit of the invention may occur to those skilled in the art. Therefore, it is intended that no limitations be placed on the invention except as defined by the scope of the appended claim.

What is claimed is:

A power supply substitution circuit comprising a source of alternating current, a pair of load terminals, a battery, an alternating current inverter, a relay having its winding connected to said source, a pair of contacts controlled by said relay and closing responsive to the de-energization of said winding, circuit means connecting said load terminals to the output circuit of said inverter through said contacts, a second relay having its winding connected to said source, a pair of contacts controlled by said second relay and closing responsive to the de-energization of said last-named winding, circuit means connecting the battery to the input circuit of said inverter through said last-named pair of contacts, a third relay having its winding connected in parallel with the input circuit of the inverter, a pair of contacts controlled by said third relay and opening responsive to energization of said last-named winding, and means connecting said last-named contacts in circuit between said load terminals and said source of alternating current, whereby said load terminals are isolated from said alternating current source responsive to the connection of the battery to the input circuit of the inverter.

References Cited in the file of this patent
UNITED STATES PATENTS

| | | |
|---|---|---|
| 1,979,326 | Harter | Nov. 6, 1934 |
| 2,094,481 | Warren | Sept. 28, 1937 |